(12) United States Patent
Ochi

(10) Patent No.: US 6,621,769 B2
(45) Date of Patent: Sep. 16, 2003

(54) DISC REPRODUCING APPARATUS

(75) Inventor: Hiroshi Ochi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 232 days.

(21) Appl. No.: 09/916,432

(22) Filed: Jul. 30, 2001

(65) Prior Publication Data

US 2002/0048230 A1 Apr. 25, 2002

(30) Foreign Application Priority Data

Aug. 29, 2000 (JP) .......................... 2000-258716

(51) Int. Cl.$^7$ .................... G11B 17/22; G11B 21/08
(52) U.S. Cl. .................... 369/30.33; 369/30.32; 369/30.93
(58) Field of Search .................... 369/30.33, 30.32, 369/30.93, 30.91, 30.94, 30.27, 30.62, 30.28, 30.5, 30.86, 179

(56) References Cited

U.S. PATENT DOCUMENTS

| | | | | |
|---|---|---|---|---|
| 4,670,866 A | * | 6/1987 | Hasegawa et al. | ............. 369/36 |
| 4,755,978 A | * | 7/1988 | Takizawa et al. | ......... 369/30.93 |
| 5,115,419 A | * | 5/1992 | Akiyama et al. | ......... 369/30.93 |
| 5,146,451 A | * | 9/1992 | Kang | .......................... 369/270 |
| 5,291,465 A | * | 3/1994 | Dennis | .................... 369/30.93 |
| 5,541,897 A | * | 7/1996 | Baca et al. | ............... 369/30.93 |
| 5,742,571 A | * | 4/1998 | Hoshino et al. | ......... 369/30.93 |
| 5,771,213 A | * | 6/1998 | Koshino et al. | ......... 369/30.93 |
| 5,848,033 A | * | 12/1998 | Park | ......................... 369/30.33 |
| 5,892,737 A | * | 4/1999 | Park | ............................. 369/33 |
| 5,903,527 A | * | 5/1999 | Park | ............................. 369/33 |
| 6,005,831 A | * | 12/1999 | Park | ............................. 369/37 |
| 6,091,677 A | * | 7/2000 | Akiyama et al. | ............. 369/37 |
| 6,163,511 A | * | 12/2000 | De Vries | ..................... 369/37 |
| RE37,170 E | * | 5/2001 | Kurosu | ..................... 369/30.91 |

FOREIGN PATENT DOCUMENTS

| | | |
|---|---|---|
| JP | 7-22758 | 5/1995 |
| JP | 7-43869 | 5/1995 |

* cited by examiner

*Primary Examiner*—Tan Dinh
(74) *Attorney, Agent, or Firm*—Morgan, Lewis & Bockius LLP

(57) ABSTRACT

Both when disc reproducing means is performing a reproduction operation on a disc, and when the disc reproducing means is not performing a reproduction operation on a disc, a tray on which a rotary table is disposed can be moved by tray driving means to a accommodating position and a discharging position. In this configuration, when the disc reproducing means is performing a reproduction operation on a disc, the tray driving means moves the tray at a low speed (step S2), and, when the disc reproducing means is not performing a reproduction operation on a disc, the tray driving means moves the tray at a high speed (step S11).

6 Claims, 4 Drawing Sheets

DISC REPRODUCING APPARATUS

BACKGROUND OF THE INVENTION

1. Technical Field

The present invention relates to a disc reproducing apparatus in which a plurality of discs are set onto a rotary table, and a tray can be discharged during a reproduction process to enable a disc to be exchanged with another one, and more particularly to a disc reproducing apparatus in which, when a tray is moved to a discharging position or a accommodating position during a process of reproducing a disc, a trouble such as a track jump is prevented from accidentally occurring.

2. Related Art

In a disc reproducing apparatus having a so-called carrousel type exchanger, a rotary table is disposed on a tray which can be moved to a discharging position and an accommodating position. A plurality of discs can be set onto the rotary table, and a reproduction operation is performed on one of the discs which are set onto the rotary table. The tray can be moved also when a disc is being reproduced. When the tray is moved during a process of reproducing a disc, therefore, a shock during the movement may cause a read error or a track jump on the reproduced disc to occur. Consequently, a technique for preventing such a trouble from occurring is proposed in the Japanese Utility Model Publication No. Hei7-22758.

In the proposed technique, the output of a focus control circuit is amplified, the outputs of a drive circuit for driving a focus coil and a tracking control circuit are amplified, and the gain of a drive circuit for driving a tracking coil is made variable. When an operation of discharging or accommodating a tray is detected, i.e., when movement of the tray is detected, a system controller increases the gains of the focusing drive circuit and the tracking drive circuit. As a result, when the tray is moved, the loop gains in the focus control and the tracking control are increased. Even when a shock due to movement of the tray is produced, therefore, the focus control and the tracking control are prevented from unexpectedly failing, thereby preventing a track jump or a read error from accidentally occurring.

PROBLEM TO BE SOLVED

Even in the case where the above-mentioned configuration is used, however, the following problem arises. Even in the case where the loop gains in the focus control and the tracking control are increased, when the moving speed of the tray is set to be higher, a large shock due to movement of the tray is produced, so that a track jump or a read error accidentally occurs. Therefore, the moving speed of the tray cannot be set to a very high level. As a result, when a disc on the rotary table is to be exchanged with another one, the user feels that the time period required for moving the tray in the accommodating position to the discharging position, and that required for moving the tray in the discharging position to the accommodating position are long, and hence the operability is poor.

SUMMARY OF THE INVENTION

The invention has been conducted in order to solve the problem. It is an object of the invention to provide a disc reproducing apparatus in which, when a reproduction operation is performed on a disc, a tray is moved at a speed that is lower than that at which the tray is moved when a reproduction operation is not performed, whereby, even when poor operability that the moving speed of the tray is low is to be improved, a track jump and a read error are prevented from accidentally occurring.

In addition to the object, it is a further object of the invention to provide a disc reproducing apparatus in which, when the tray approaches the discharging position or the accommodating position, the speed of moving the tray is lowered, whereby, even when a track jump and a read error are prevented from accidentally occurring, the time period required for moving the tray can be shortened.

In addition to the object, it is a still further object of the invention to provide a disc reproducing apparatus in which, when an FG signal indicates that a disc motor is rotating, it is judged that a reproduction operation is being performed, whereby the work of modifying an apparatus in which the speed of moving the tray in the case where the reproduction operation is performed is identical with that in the case where the reproduction operation is not performed, to an apparatus in which the speed of moving the tray in the case where the reproduction operation is performed is different from that in the case where the reproduction operation is not performed can be minimized.

MEANS FOR SOLVING THE PROBLEMS

In order to solve the problem, the invention is applied to a disc reproducing apparatus comprising: a tray which is movably disposed in an apparatus body; tray driving means for moving the tray to an accommodating position and a discharging position; a rotary table which is rotatably attached to the tray, and in which a plurality of disc holding portions are formed around a rotation shaft; and disc reproducing means, disposed separately from the tray, for, when the tray is in the accommodating position, clamping a disc which is held by one of the disc holding portions, and reproducing the clamped disc, both when the disc reproducing means is performing a reproduction operation on a disc, and when the disc reproducing means is not performing a reproduction operation on a disc, the tray being movable to the accommodating position and the discharging position. When the disc reproducing means is performing a reproduction operation on a disc, the tray driving means moves the tray at a speed that is lower than a speed at which, when the disc reproducing means is not performing a reproduction operation on a disc, the tray driving means moves the tray.

When the disc reproducing means is not performing a reproduction operation on a disc, the tray is moved at a high speed. Therefore, the time period required for moving the tray is short, and comfortable operability is attained. When the disc reproducing means is performing a reproduction operation on a disc, the tray is moved at a low speed. Therefore, a shock and vibrations which are produced by movement of the tray is suppressed. In the disc reproducing means, consequently, a read error and a tracking failure do not occur.

In addition to the above-mentioned configuration, when the tray approaches the discharging position or the accommodating position, the tray driving means lowers the speed at which the tray driving means moves the tray.

Namely, the time period required for moving the tray is prevented from being prolonged, and a shock which is produced when the tray is stopped is suppressed.

The invention is applied to a disc reproducing apparatus in which, in addition to the above-mentioned configuration, FG signal generating means for generating an FG signal is disposed in a disc motor for rotating a disc, and the tray driving means judges whether a disc is being reproduced or not, on the basis of an output of the FG signal generating means.

Namely, the configuration can be changed to that in which the speed of moving the tray when a reproduction operation is performed is lower than that when a reproduction operation is not performed, simply by conducting a change of supplying the FG signal to the tray driving means and modifying the tray driving means.

DETAILED DESCRIPTION OF THE PREFERRED EMBODIMENTS

Mode for Carrying Out the Invention

Hereinafter, an embodiment of the invention will be described with reference to the accompanying drawings.

Figure 2:
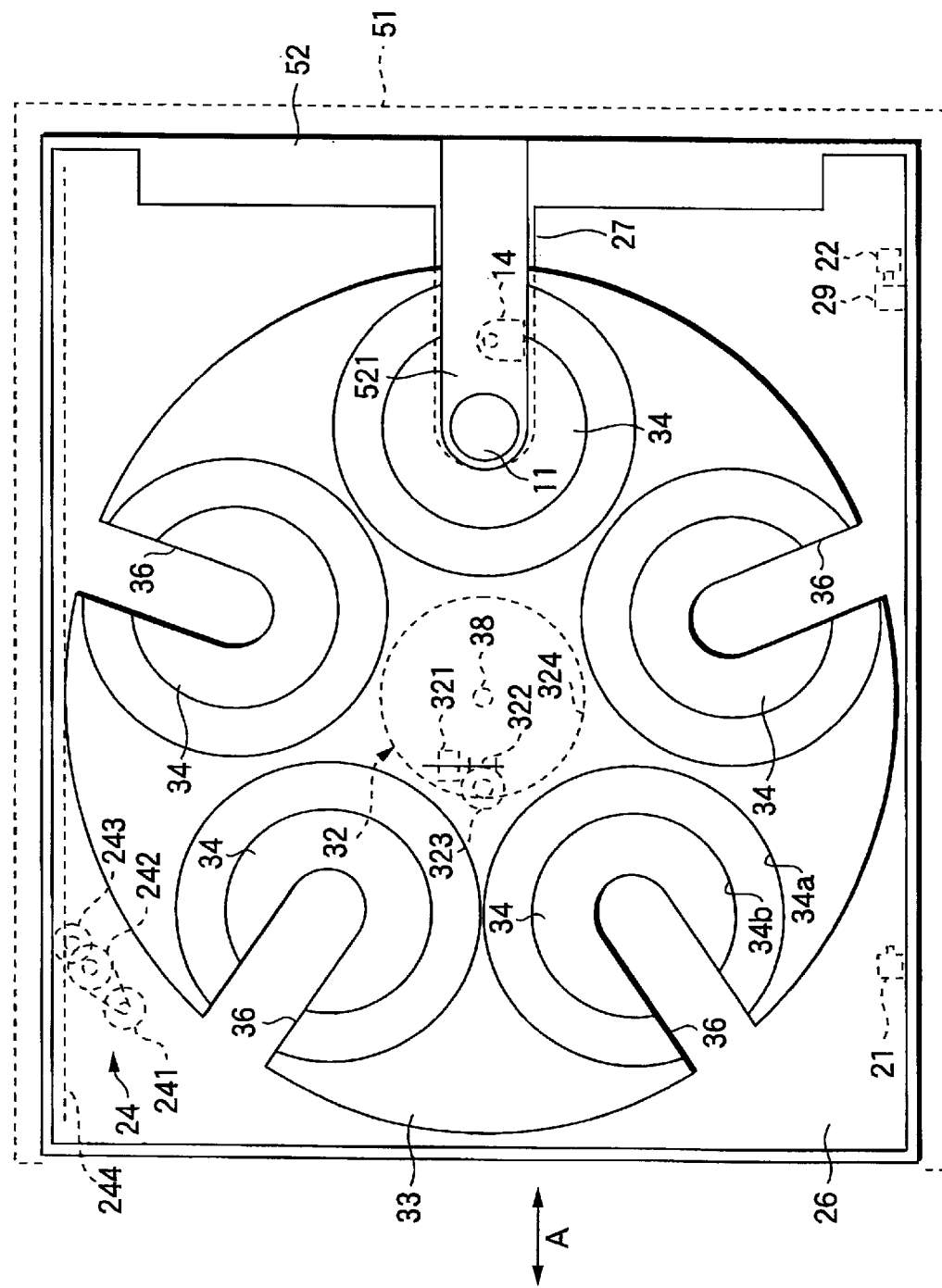
FIG. 2 is a plan view schematically showing the mechanism of the embodiment.
Figure 3:
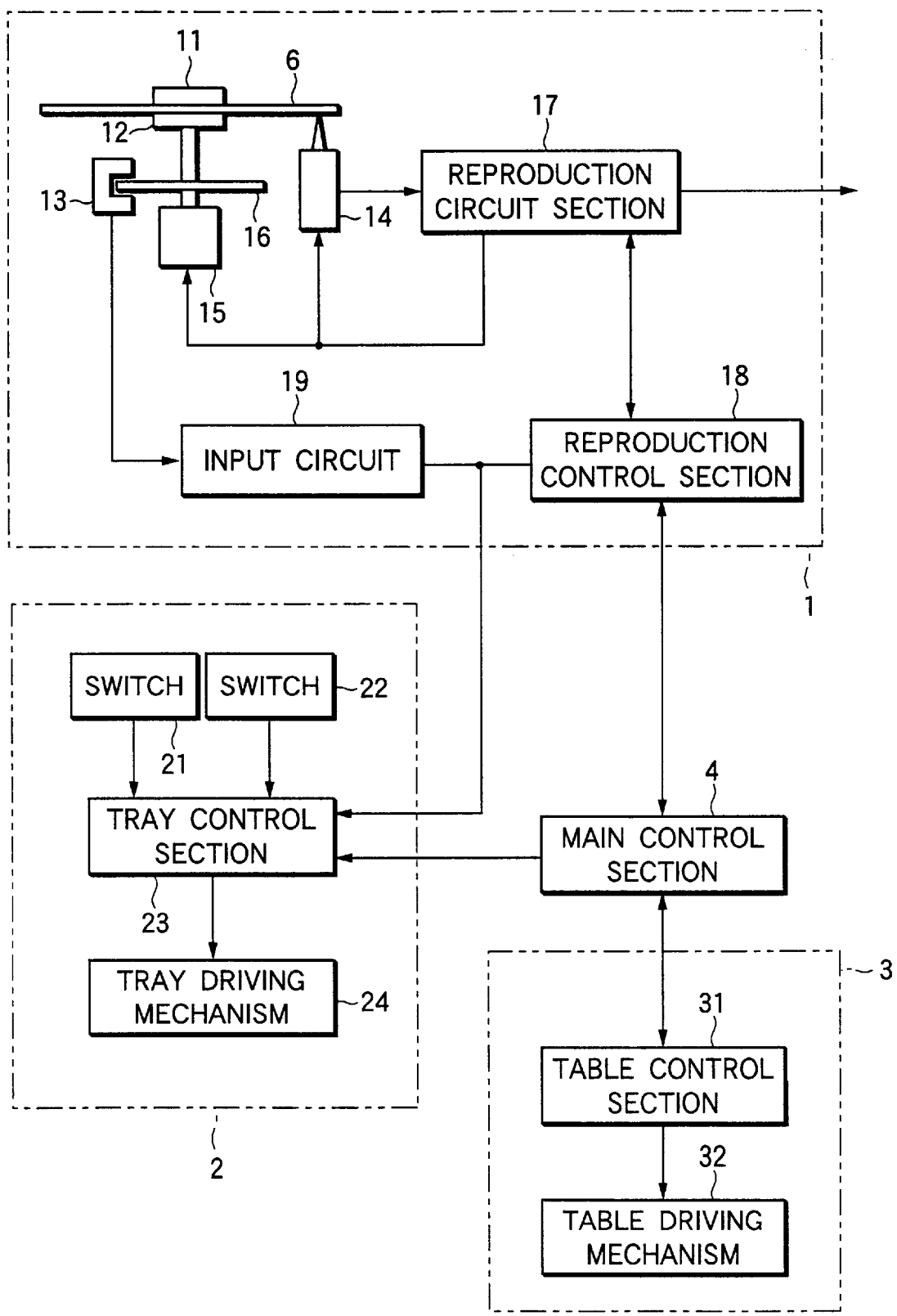
FIG. 3 is a block diagram showing the electrical configuration of the embodiment.

FIG. 2 is a plan view schematically showing the mechanism of an embodiment of the disc reproducing apparatus of the invention, and FIG. 3 is a block diagram showing the electrical configuration of the embodiment. The embodiment is an apparatus which can reproduce a DVD and a CD.

First, the mechanism of the embodiment will be described. A tray 26 is movably disposed on the apparatus body (indicated by the broken line 51) 51. Specifically, the tray 26 is disposed so as to be movable in the directions of the arrow A, on a chassis 52 which is placed inside the apparatus body 51. A rotary table 33 is attached to the tray 26 so as to be rotatable about a rotation shaft 38. On the rotary table 33, plural (five, in the embodiment) disc holding portions 34 are formed around the rotation shaft 38.

A groove 34a for a 12-cm disc, and a groove 34b for an 8-cm disc are formed in each of the disc holding portions 34. A cutaway 36 is formed in each disc holding portion 34 so as to elongate toward the outer periphery of the rotary table 33. A turn table 12 which pairs with a disc damper 11 to clamp a disc 6, and a pickup 14 are to be inserted into the cutaway.

A cutaway 27 is formed in the center of a rear end portion of the tray 26 so as to communicate with the cutaway 36 of the disc holding portion 34 which is located in the position, thereby enabling the tray 26 and the rotary table 33 to, also when the disc 6 is being reproduced, be moved to a discharging position without being hindered by the turn table 12 and the pickup 14.

The disc damper 11 is supported by a supporting member 521 so as to be movable above the rotary table 33. Below the disc damper 11, a disc motor 15 for rotating the turn table 12 is attached to the chassis 52 via a sub chassis which is not shown, in such a manner that the motor is raised when a reproduction operation is to be performed, and lowered when the reproduction operation is to be stopped.

A tray driving mechanism 24 is a block disposed on the chassis 52, and comprises a motor 241, a pulley 242 which transmits rotation of the motor 241, and a gear 243. The gear 243 meshes with a rack 244 which is formed along one inner side face of the lower portion of the tray 26, thereby moving the tray 26 to the discharging position and an accommodating position.

A table driving mechanism 32 is a block disposed on the tray 26, and comprises a motor 321, a worm gear 322 attached to the rotation shaft of the motor 321, and a gear 323 which meshes with the worm gear 322. The gear 323 meshes with a gear 324 which is formed on the lower face of the rotary table 33, thereby rotating the rotary table 33.

Two switches 21 and 22 are attached to the chassis 52, and a pushing projection 29 is formed on the other inner side face of the lower portion of the tray 26. When the tray 26 is moved to the accommodating position, the switch 22 is activated, and, when the tray 26 is moved to the discharging position, the switch 21 is activated.

As roughly classified electrical components, the embodiment comprises disc reproducing means 1, tray driving means 2, table driving means 3, and a main control section 4.

The disc reproducing means 1 is a block which, when the tray 26 is in the accommodating position (the position shown in FIG. 2), clamps the disc 6 held by one of the disc holding portions 34, and then reproduces the clamped disc 6. The table driving means 3 is a block which rotates the rotary table 33 in order to exchange a disc to be reproduced, or a disc to be set. The main control section 4 is a block which controls the operation of the disc reproducing apparatus.

The tray driving means 2 is a block which moves the tray 26 to the discharging position and the accommodating position. Both when the disc reproducing means 1 is performing a reproduction operation on the disc 6, and when the means is not performing a reproduction operation, the tray driving means moves the tray 26 from the accommodating position to the discharging position, or from the discharging position to the accommodating position. When the disc reproducing means 1 is performing a reproduction operation on the disc 6, the tray driving means moves the tray 26 at a speed that is lower than that when the disc reproducing means is not performing a reproduction operation.

During a process of moving the tray 26, when the tray 26 approaches the discharging position or the accommodating position, the tray driving means 2 lowers the moving speed of the tray 26. The tray driving means judges whether the disc reproducing means 1 is performing a reproduction operation on the disc 6 or not, based on whether the disc motor 15 is rotating or not.

Specifically, the disc motor 15 is supported by the chassis 52 so as to be vertically movable, and rotates the disc 6 so that the linear velocity of the track is constant. A rotary disc 16 in which a plurality of slits are formed is attached to the rotation shaft of the disc motor 15. A photo-interrupter 13 is disposed in order to detect the slits formed in the rotary disc 16. The rotary disc 16 and the photo-interrupter 13 constitute FG signal generating means for generating an FG signal indicative of the rotational speed of the disc motor 15. An input circuit 19 is a block which waveform-shapes an output of the photo-interrupter 13. The waveform-shaped output is supplied to a reproduction control section 18 and a tray control section 23.

A reproduction circuit section 17 is a block which performs a servo control for enabling the pickup 14 to follow the track of the disc 6, and setting the linear velocity of the track to a predetermined one. The reproduction circuit section performs demodulation, error correction, and D/A conversion on a signal which has been reproduced by the pickup 14, whereby a signal recorded on the disc 6 is supplied to the outside in the form of an analog signal.

The reproduction control section 18 is a block which detects the rotational speed of the disc motor 15 on the basis of the output of the input circuit 19, and controls the operation of the reproduction circuit section 17 in accordance with the detected rotational speed, thereby performing various controls for reproducing the disc 6. Specifically, the reproduction control section performs controls such as that for starting and stopping reproduction of the disc 6, that for a track jump, and that for rapidly stopping rotation of the disc 6.

A table control section 31 is a block which controls the operation of the table driving mechanism 32 to control rotation of the rotary table 33. Namely, the section controls the rotary table 33 to rotate so that a disc placed on the disc holding portion 34 which is instructed by the main control section 4 is moved to a position where the disc can be reproduced by the disc reproducing means 1.

When the main control section 4 gives discharge instructions while the tray 26 is in the accommodating position, the tray control section 23 controls the tray driving mechanism 24 so that the tray 26 is moved from the accommodating position to the discharging position. By contrast, when the main control section 4 gives accommodation instructions while the tray 26 is in the discharging position, the tray control section 23 controls the tray driving mechanism 24 so that the tray 26 is moved from the discharging position to the accommodating position.

Specifically, the tray control section 23 judges whether the disc 6 is being reproduced or not, on the basis of the output of the input circuit 19. If the disc 6 is being reproduced, movement of the tray 26 at a low speed is started. When the tray 26 approaches a stop position, the moving speed is changed to a lower one. If the disc 6 is not being reproduced, movement of the tray 26 at a high speed is started. When the tray 26 approaches the stop position, the moving speed is changed to a lower one.

Figure 1:
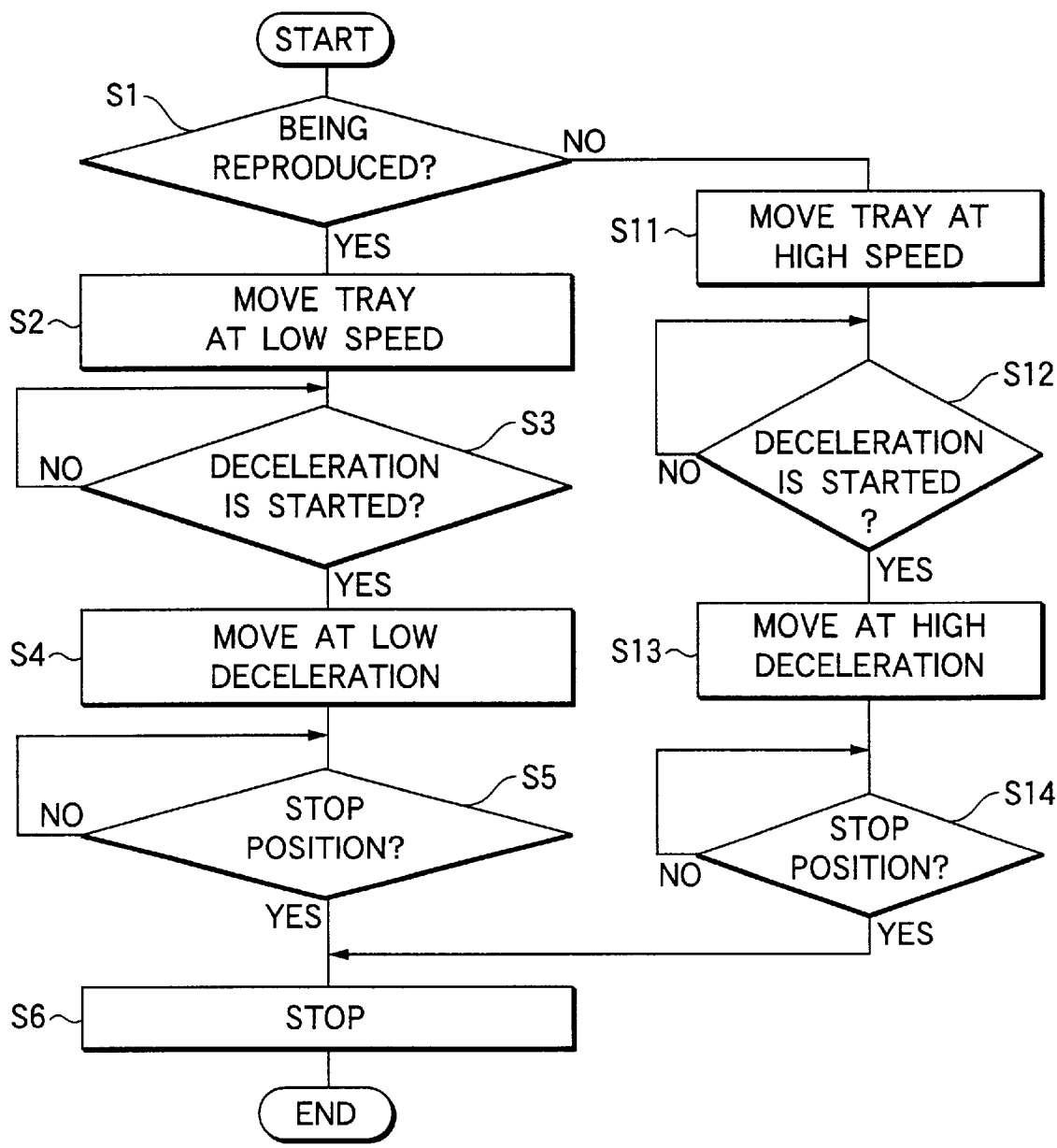
FIG. 1 is a flowchart showing principal operations of an embodiment of the disc reproducing apparatus of the invention.
Figure 4:
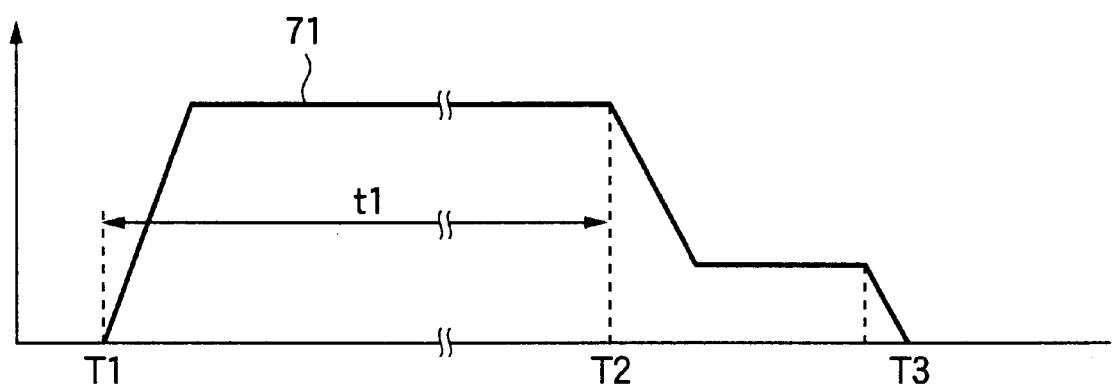
FIG. 4 is a diagram showing changes of the moving speed of a tray.
Figure 4:
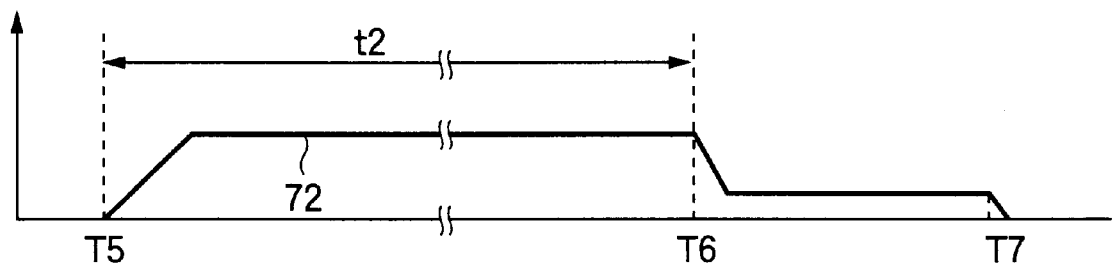

FIG. 1 is a flowchart showing principal operations of the embodiment, and FIG. 4 is a diagram showing changes of the moving speed of the tray 26 (71 indicates the speed change in the case where the disc 6 is not being reproduced, and 72 indicates the speed change in the case where the disc is being reproduced). The operations will be described with reference to the figures as required.

It is assumed that the tray 26 is in the accommodating position and the disc reproducing means 1 is not performing the reproduction operation on the disc 6. Under this state, when the main control section 4 gives instructions for moving the tray 26, the tray control section 23 checks whether the disc reproducing means 1 is performing a reproduction operation on the disc 6 or not, on the basis of the output of the input circuit 19. Namely, the section checks whether a level change is produced in the output of the input circuit 19 or not (step S1). At this time, the disc reproducing means 1 is not performing the reproduction operation on the disc 6, and rotation of the disc motor 15 is stopped. Therefore, a level change is not produced in the output of the input circuit 19. As a result, the tray control section 23 judges that the disc 6 is not being reproduced.

When it is judged that the disc 6 is not being reproduced (time T1), the tray control section 23 controls the motor 241 of the tray driving mechanism 24 to rotate at a high speed so that the tray 26 is moved at a high speed (step S11). Therefore, the tray 26 starts to be moved at the high speed from accommodating position toward the discharging position. At time T1 when movement of the tray 26 is started, the tray control section 23 starts to count a first time period t1. The first time period t1 to be counted is set to a time period which, when the tray 26 is moved at the high speed, is required for moving the tray 26 in the accommodating position to the vicinity of the discharging position (this time period is equal to a time period which is required for moving the tray 26 in the discharging position to the vicinity of the accommodating position).

When the first time period t1 is counted, the tray control section 23 continues the control for moving the tray 26 at the high speed. When the counting of the first time period t1 is completed (time T2), the tray control section 23 judges that the tray 26 is in a position close to the discharging position, i.e., the stop position, and changes the driving mode of the motor 241 from the high-speed driving mode to the low-speed driving mode so that the moving speed of the tray 26 is changed to a speed which is lower than the previous one (for example, a speed which is one third of the moving speed during the first time period t1) (steps S12 and S13).

The tray control section 23 then checks whether the switch 21 indicating that the tray 26 is moved to the discharging position is turned ON or not. If the switch 21 is turned ON, it is judged that the tray 26 is moved to the discharging position, and the driving of the motor 241 is halted so that movement of the tray 26 is stopped (steps S14 and S6).

It is assumed that the tray 26 is in the discharging position and the disc reproducing means 1 is performing the reproduction operation on the disc 6. Under this state, when the main control section 4 gives instructions for moving the tray 26, the tray control section 23 checks whether the disc reproducing means 1 is performing a reproduction operation on the disc 6 or not, on the basis of the output of the input circuit 19. Namely, the section checks whether a level change is produced in the output of the input circuit 19 or not (step S1). At this time, the disc reproducing means 1 is performing the reproduction operation on the disc 6, and the disc motor 15 is rotated. Therefore, a level change is produced in the output of the input circuit 19. As a result, the tray control section 23 judges that the disc 6 is being reproduced.

If it is judged that the disc 6 is being reproduced (time T5), the tray control section 23 controls the motor 241 of the tray driving mechanism 24 so that the tray 26 is moved at a low speed (step S2) (the moving speed is set to, for example, a speed which is one third of the moving speed that is set in step S11). Therefore, the tray 26 starts to be moved at a low speed from the discharging position toward the accommodating position. As a result, a shock which is produced when the tray 26 starts to be moved, and vibrations during movement are suppressed.

At time T5 when movement of the tray 26 is started, the tray control section 23 starts to count a second time period t2. The second time period t2 to be counted is set to a time period which, when the tray 26 is moved at the low speed, is required for moving the tray 26 in the discharging position to the vicinity of the accommodating position (this time period is equal to a time period which is required for moving the tray 26 in the accommodating position to the vicinity of the discharging position).

When the second time period t2 is counted, the tray control section 23 continues the control for moving the tray 26 at the low speed. When the counting of the second time period t2 is completed (time T6), the tray control section 23 judges that the tray 26 is in a position close to the accommodating position, i.e., the stop position, and changes the driving mode of the motor 241 from the low-speed driving mode to the very-low-speed driving mode so that the moving speed of the tray 26 is changed to a speed which is lower than the previous one (for example, a speed which is one third of the moving speed during the second time period t2) (steps S3 and S4).

The tray control section 23 then checks whether the switch 22 detecting that the tray 26 is moved to the accommodating position is turned ON or not. If the switch 22 is turned ON, it is judged that the tray 26 is moved to the accommodating position, and the driving of the motor 241 is halted so that movement of the tray 26 is stopped (steps S5 and S6)

As described above, when the disc reproducing means 1 is not performing the reproduction operation on the disc 6, the tray 26 is moved at a high speed. Therefore, the time period required for moving the tray 26 from the accommodating position to the discharging position, or from the discharging position to the accommodating position is short. As a result, the user can obtain comfortable operability. When the disc reproducing means 1 is performing the reproduction operation on the disc 6, the tray 26 is moved at a low speed. Therefore, a shock and vibrations which are produced by movement of the tray 26 is suppressed. Even when the tray 26 is moved, consequently, a tracking failure does not occur in the disc reproducing means 1. Also when the tray 26 is moved, therefore, the user can comfortably enjoy reproduced music.

When the tray 26 approaches the stop position, the moving speed is changed to a speed which is lower than the previous one, so that a shock produced when the tray 26 is stopped is suppressed. Consequently, a shock produced when the tray 26 is stopped is suppressed while preventing the time period required for moving the tray 26 from being prolonged.

The tray control section 23 judges whether the disc reproducing means 1 is performing the reproduction operation on the disc 6 or not, on the basis of the FG signal generated by the FG signal generating means. An apparatus can be changed to that in which the speed of moving the tray 26 when a reproduction operation is performed is lower than that when a reproduction operation is not performed, simply by changing the configuration of the tray control section 23 in the tray driving means 2 while the disc reproducing means 1, the table driving means 3, and the main control section 4 are unchanged in configuration in both the cases where the disc 6 is being reproduced, and where the disc is not being reproduced. Namely, the apparatus can be changed in a simple manner.

Effects of the Invention

As described above, the disc reproducing apparatus of the invention has a configuration where, both when disc reproducing means is performing a reproduction operation on a disc, and when the disc reproducing means is not performing a reproduction operation on a disc, a tray on which a rotary table is disposed can be moved by tray driving means to the accommodating position and the discharging position. In the configuration, when the disc reproducing means is performing a reproduction operation on a disc, the tray driving means moves the tray at a speed that is lower than a speed at which, when the disc reproducing means is not performing a reproduction operation on a disc, the tray driving means moves the tray. When the disc reproducing means is not performing a reproduction operation on a disc, therefore, the time period required for moving the tray is short, and comfortable operability is attained. When the disc reproducing means is performing a reproduction operation on a disc, a shock and vibrations which are produced by movement of the tray is suppressed, and, in the disc reproducing means, a read error and a tracking failure therefore do not occur. Even when poor operability that the moving speed of the tray is low is to be improved, therefore, a track jump and a read error are prevented from accidentally occurring.

Furthermore, when the tray approaches the accommodating position or the discharging position, the tray driving means lowers the speed of moving the tray. Therefore, the time period required for moving the tray is prevented from being prolonged, and a shock which is produced when the tray is stopped is suppressed. Even when a track jump and a read error are prevented from accidentally occurring, consequently, the time period required for moving the tray can be shortened.

Moreover, the invention is applied to a disc reproducing apparatus in which FG signal generating means for generating an FG signal is disposed in a disc motor for rotating a disc, and the tray driving means judges whether a disc is being reproduced or not, on the basis of an output of the FG signal generating means. Therefore, the configuration can be changed to that in which the speed of moving the tray when a reproduction operation is being performed is lower than that when a reproduction operation is not being performed, simply by conducting a change of supplying the FG signal to the tray driving means and modifying the tray driving means. As a result, the work of modifying an apparatus in which the speed of moving the tray in the case where the reproduction operation is being performed is identical with that in the case where the reproduction operation is not being performed, to an apparatus in which the speed of moving the tray in the case where the reproduction operation is being performed is different from that in the case where the reproduction operation is not being performed can be minimized.

What is claimed is:

1. A disc reproducing apparatus comprising:
   a tray which is movably disposed in an apparatus body;
   tray driving means for moving said tray to an accommodating position and a discharging position;
   a rotary table which is rotatably attached to said tray, and in which a plurality of disc holding portions are formed around a rotation shaft; and
   disc reproducing means, disposed separately from said tray, for, when said tray is in the accommodating position, clamping a disc which is held by one of said disc holding portions, and reproducing said clamped disc,
   both when said disc reproducing means is performing a reproduction operation on a disc, and when said disc reproducing means is not performing a reproduction operation on a disc, said tray being movable to the accommodating position and the discharging position, wherein
   when said disc reproducing means is performing a reproduction operation on a disc, said tray driving means moves said tray at a speed that is lower than a speed at which, when said disc reproducing means is not performing a reproduction operation on a disc, said tray driving means moves said tray.

2. The disc reproducing apparatus according to claim 1, wherein, when said tray approaches the discharging position or the accommodating position, said tray driving means lowers the speed at which said tray driving means moves said tray.

3. The disc reproducing apparatus according to claim 1, wherein

FG signal generating means for generating an FG signal is disposed in a disc motor for rotating a disc, and said tray driving means judges whether a disc is being reproduced or not, on the basis of an output of said FG signal generating means.

4. A disc reproducing apparatus comprising:

a tray which is movably disposed in an apparatus body;

tray driving member for moving said tray to an accommodating position and a discharging position;

a rotary table which is rotatably attached to said tray, and in which a plurality of disc holding portions are formed around a rotation shaft; and disc reproducing member, disposed separately from said tray, for, when said tray is in the accommodating position, clamping a disc which is held by one of said disc holding portions, and reproducing said clamped disc, both when said disc reproducing member is performing a reproduction operation on a disc, and when said disc reproducing member is not performing a reproduction operation on a disc, said tray being movable to the accommodating position and the discharging position, wherein when said disc reproducing member is performing a reproduction operation on a disc, said tray driving member moves said tray at a speed that is lower than a speed at which, when said disc reproducing member is not performing a reproduction operation on a disc, said tray driving member moves said tray.

5. The disc reproducing apparatus according to claim 4, wherein, when said tray approaches the discharging position or the accommodating position, said tray driving member lowers the speed at which said tray driving member moves said tray.

6. The disc reproducing apparatus according to claim 5, wherein

FG signal generating member for generating an FG signal is disposed in a disc motor for rotating a disc, and said tray driving member judges whether a disc is being reproduced or not, on the basis of an output of said FG signal generating member.

* * * * *